E. W. PALMQUIST.
BRAKE ARRANGEMENT.
APPLICATION FILED JUNE 27, 1918.
1,325,532.
Patented Dec. 23, 1919.
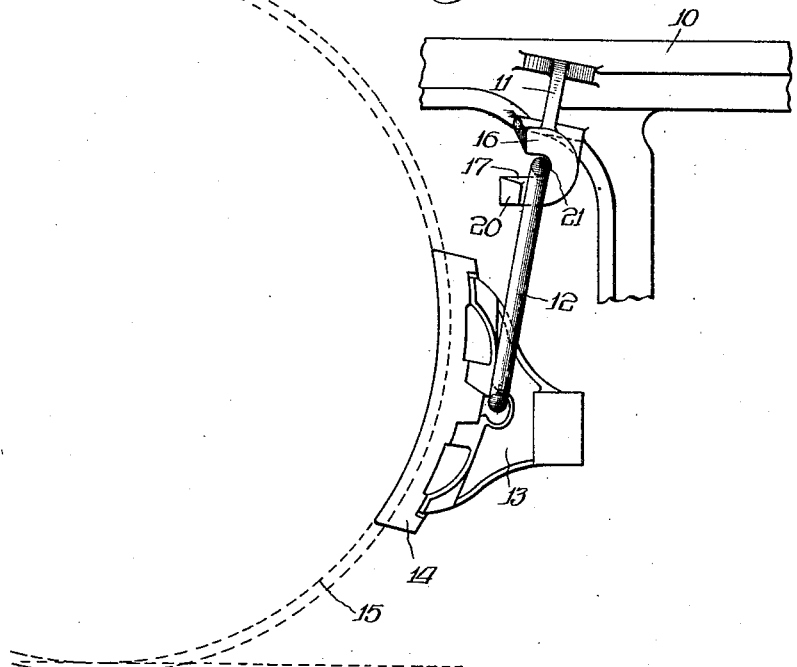
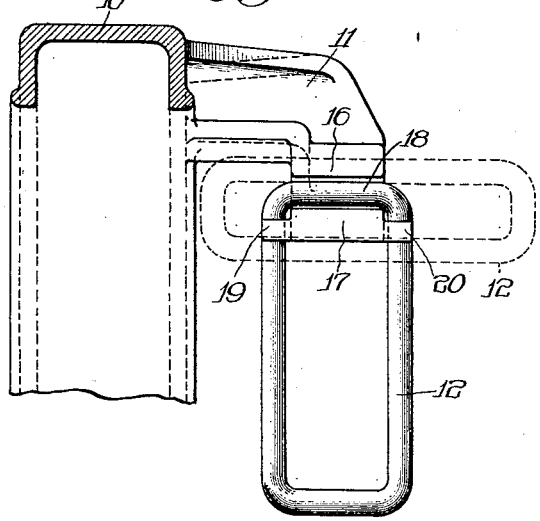
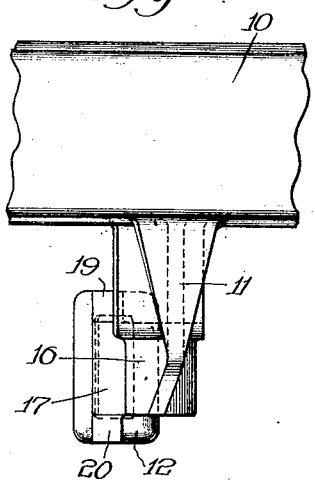
Witnesses:
Inventor
Eric W Palmquist
By Wilkinson & Huxley
Attys.

UNITED STATES PATENT OFFICE.

ERIC W. PALMQUIST, OF CHICAGO, ILLINOIS, ASSIGNOR TO AMERICAN STEEL FOUNDRIES, OF CHICAGO, ILLINOIS, A CORPORATION OF NEW JERSEY.

BRAKE ARRANGEMENT.

1,325,532.　　　　　Specification of Letters Patent.　　Patented Dec. 23, 1919.

Application filed June 27, 1918. Serial No. 242,136.

*To all whom it may concern:*

Be it known that I, ERIC W. PALMQUIST, a citizen of the United States, residing at Chicago, in the county of Cook and State of Illinois, have invented certain new and useful Improvements in Brake Arrangements, of which the following is a specification.

This invention relates to brake arrangements.

The object of this invention is to provide a simple, inexpensive and durable brake arrangement wherein the brake hanger may be readily applied to its support, locked therein in a normal operative position, and be readily withdrawn therefrom.

The invention is illustrated on accompanying sheet of drawings in which,

Figure 1 is a fragmentary side elevation of a railway car truck embodying my invention.

Fig. 2 is a sectional view through the truck side frame and showing the manner of applying the brake hanger to its associated support, and Fig. 3 is a fragmentary plan view of the arrangement shown in Fig. 2.

The truck side frame 10 is provided with a lateral extending support 11 to which a brake hanger 12 is connected, the lower end of the hanger being connected to a brake head 13 carrying a brake shoe 14 for coöperation with an associated truck wheel 15.

At the outer end of the support 10, upper and lower jaws 16 and 17 are provided, said jaws being spaced for the reception of the upper portion 18 of the link or closed loop hanger 12.

One of the problems met in the use of a link brake hanger is to apply the same to and remove it from its support without removing the truck wheels, and at the same time having the hanger locked in its normal operative position when so placed. To meet this problem I have provided the lower jaw member 17 with lateral extending projections 19 and 20 extending in opposite directions from opposite sides of the lower jaw 17 and beyond the confines thereof. In order to apply the hanger, it is necessary to move it into a horizontal position, as shown in dotted lines in Fig. 2, whereupon one of the long legs of the hanger may be passed over the lower jaw 17 and into the bearing portion 21 of the support whereupon the hanger may be turned through an angle of 90° into the position shown in full lines in Figs. 1 and 2, wherein the long legs of the hanger are arranged vertically, and the upper ends thereof are located behind the projections 19 and 20. It is impossible to remove the hanger from this locked position in its support without first moving the hanger to an angle of 90° back into the dotted line position shown in Fig. 2 of the drawings. However, this unlocking movement is impossible when the hanger is applied to the brake head, as shown in Fig. 1 of the drawings.

By means of this arrangement the closed link hanger with its jaws is readily applied to its support, locked therein and readily withdrawn therefrom in a manner to meet the requirements for successful commercial operation.

It is my intention to cover all modifications of the invention falling within the spirit and scope of the following claim.

What I claim is:

In brake mechanism, the combination of a support having jaws, one of which is provided with a plurality of oppositely extending projections, and a closed link brake hanger applied between said jaws when in a horizontal position and moved into a vertical position when behind said projections, whereby the hanger is locked in a given position.

Signed at Chicago, Illinois, this 19 day of June, 1918.

ERIC W. PALMQUIST.